May 12, 1931.  C. H. DUFFY  1,804,678
AUTO WHEEL AND TIRE LOCK
Filed April 18, 1928
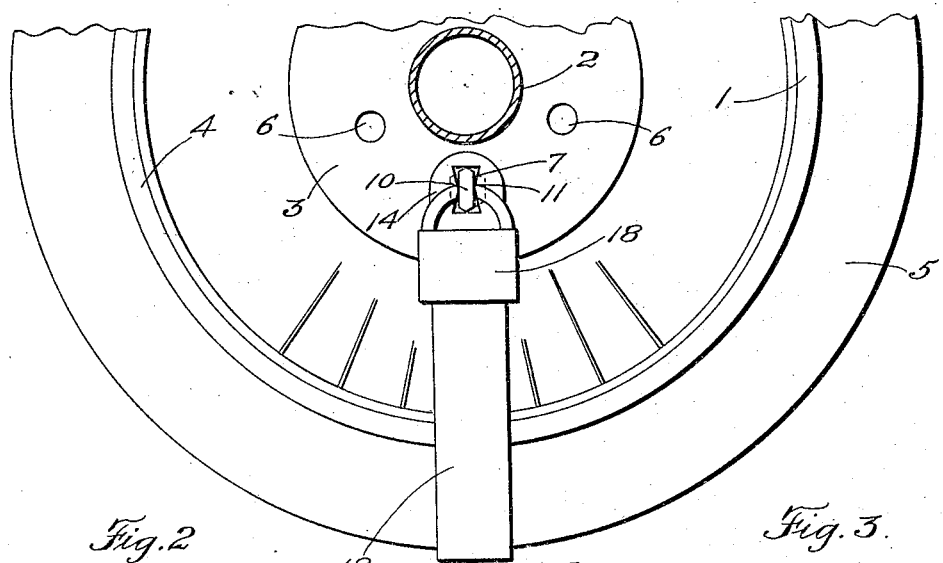
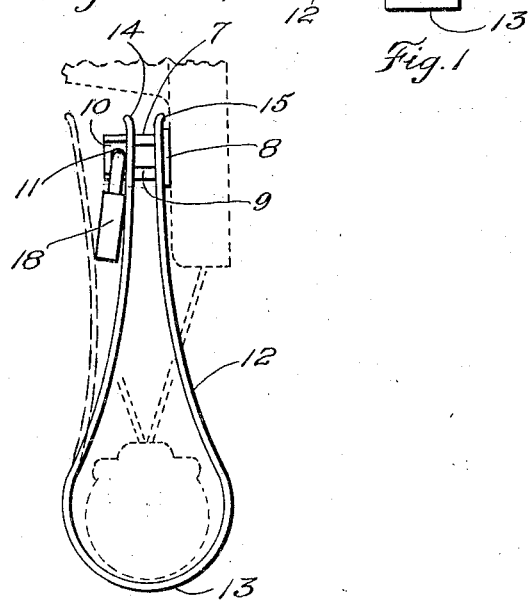
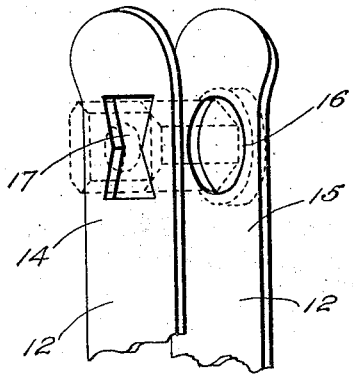
INVENTOR.
Charles Hugh Duffy
BY Robert H. Young
ATTORNEY.

Patented May 12, 1931

1,804,678

UNITED STATES PATENT OFFICE

CHARLES HUGH DUFFY, OF MIAMI, FLORIDA

AUTO WHEEL AND TIRE LOCK

Application filed April 18, 1928. Serial No. 270,938.

This invention relates to devices for locking the spare wheel and tire of an automobile, and has for its object to provide means whereby the element that secures the tire against removal from the wheel also functions to lock one of the wheel securing nuts against rotation and removal.

A further object of the invention is to provide improvements over the conventional chain and padlock generally employed to secure a spare tire and wheel against surreptitious removal or theft.

When using a chain and padlock, the same are whipping around against the parts, and besides being a source of noise and rattle, they tend to scar and mar the fine finish of the parts, and lend a generally crude and unfinished appearance to the car.

Referring to the accompanying drawings:

Fig. 1 is a fragmentary elevation of a wire wheel, the hub being shown in vertical section, the figure illustrating the application of the invention.

Fig. 2 is a side elevation of the device, the wheel and tire being shown fragmentally in dotted lines.

Fig. 3 is an enlarged perspective view of the ends of the device in operative position on a wheel securing nut shown in dotted lines.

Like numerals of reference indicate the same parts throughout the several figures, in which:

1 indicates a spare wheel, in which 2 is the hub, 3 is the inside hub-flange, 4 is the rim and 5 is the tire.

The hub-flange 3 is provided with a plurality of holes 6 which receive studs and nuts by means of which the wheel is secured in operative position.

When carrying such a wheel as a spare wheel, one or more of the holes 6 receive studs and nuts for mounting the wheel on a suitable bracket (not shown) provided on the car.

In the accompanying drawing, one of these securing nuts is shown and is designated by the numeral 7. In the form of nut shown, the same includes an annular bottom flange 8, a hex or wrench accommodating portion 9, and a narrow flattened extension 10 having a transverse hole 11 therethrough.

Referring now to the embodiment of the invention shown in the drawing, it will be seen that the same includes a member or strap 12 of a suitable tough metal bent in the form of a loop 13, the free ends 14 and 15 of which are spaced apart and lie one over the other and are capable of approaching each other as shown in Fig. 2.

In the end 15 of the member 12, I provide a hole 16 of a size sufficient to permit the said end to freely pass over the hex portion 9 of the nut 7 and rest against the annular flange 8 of the nut, while in the end 14 I provide an elongated slot 17 adapted to freely pass over the narrow flattened extension 10 of the nut 7 and engage the flattened sides of said extension 10 in such manner as to lock the nut 7 against rotation. When the device has been thus applied to the nut 7, a padlock 18 is applied through the transverse hole 11 in said flattened extension, which locks the assembly.

Having thus described the invention, its operation is obvious. The member 12 is passed over the tire 5 and between the spokes of the wheel. The end 15 of the member 12 is applied over the hex portion 9 of the nut, and the end 14 is then pressed from position shown in broken lines over the flattened extension 10, which has first been set to lie in a substantially vertical position. The shackle of a padlock 18 is then passed through the hole 11 in the flattened extension 10, as shown in the drawings. This effectually locks the nut 7 against rotation and removal, retains the tire 5 against removal from the wheel 1, while the tension of the end 14 against the shackle of the padlock 18 holds the padlock stationary and against rattling.

Having thus fully described the invention, what I claim as new and desire to secure by Letters Patent of the United States is:

A device of the character described including, in combination with a wheel and tire and a wheel-retaining nut comprising a wrench accommodating portion and having a transverse hole therethrough, a metal loop-shaped member adapted to straddle the tire, the ends of said member being adapted to extend to the said wheel-retaining nut, one of said ends being provided with means for engagement with the nut, the other of said ends being provided with means for engagement with the nut to prevent rotation of the nut relatively to the said loop-shaped member and adapted to be retained in such engagement with the nut by a pad-lock secured in the hole in the nut.

In testimony whereof I affix my signature.

CHARLES HUGH DUFFY.